United States Patent

[11] 3,597,590

| | | |
|---|---|---|
| [72] | Inventor | Bobby R. Fleming<br>Bay Springs, Miss. |
| [21] | Appl. No. | 798,722 |
| [22] | Filed | Feb. 12, 1969 |
| [45] | Patented | Aug. 3, 1971 |
| [73] | Assignee | Northern Electric Company<br>Chicago, Ill. |

[54] ELECTRIC BLANKET CONTROL
6 Claims, 1 Drawing Fig.

[52] U.S. Cl. .................................................. 219/501
[51] Int. Cl. .................................................. H05b 1/02
[50] Field of Search .......................................... 219/494, 499, 501

[56] References Cited
UNITED STATES PATENTS

| 3,215,818 | 11/1965 | Deaton ...................... | 219/499 |
| 3,275,802 | 9/1966 | Van Divere et al. .......... | 219/499 |
| 3,381,226 | 4/1968 | Jones et al. .................. | 219/501 |

Primary Examiner—Harold Broome
Assistant Examiner—F. E. Bell
Attorney—Hill, Sherman, Meroni, Gross & Simpson ABSTRACT: An electronic control for an electric blanket or other heated device in which the heating element of the blanket senses the ambient temperature and the other elements of the control are separated from the heating element so that the components of the control are less susceptible to sensing change in ambient temperature near the blanket. The electronic control circuit controls current to the heating element of the blanket by gating an SCR at the zero crossings of the applied voltage so as to prevent radiofrequency interference which would occur if the SCR were switched at other than the zero crossings. Unidirectional current means is connected in a bridge circuit which controls the gating of the SCR so that the temperature coefficients of the components in the two legs of the bridge circuit are balanced enhancing temperature compensation.

PATENTED AUG 3 1971 3,597,590
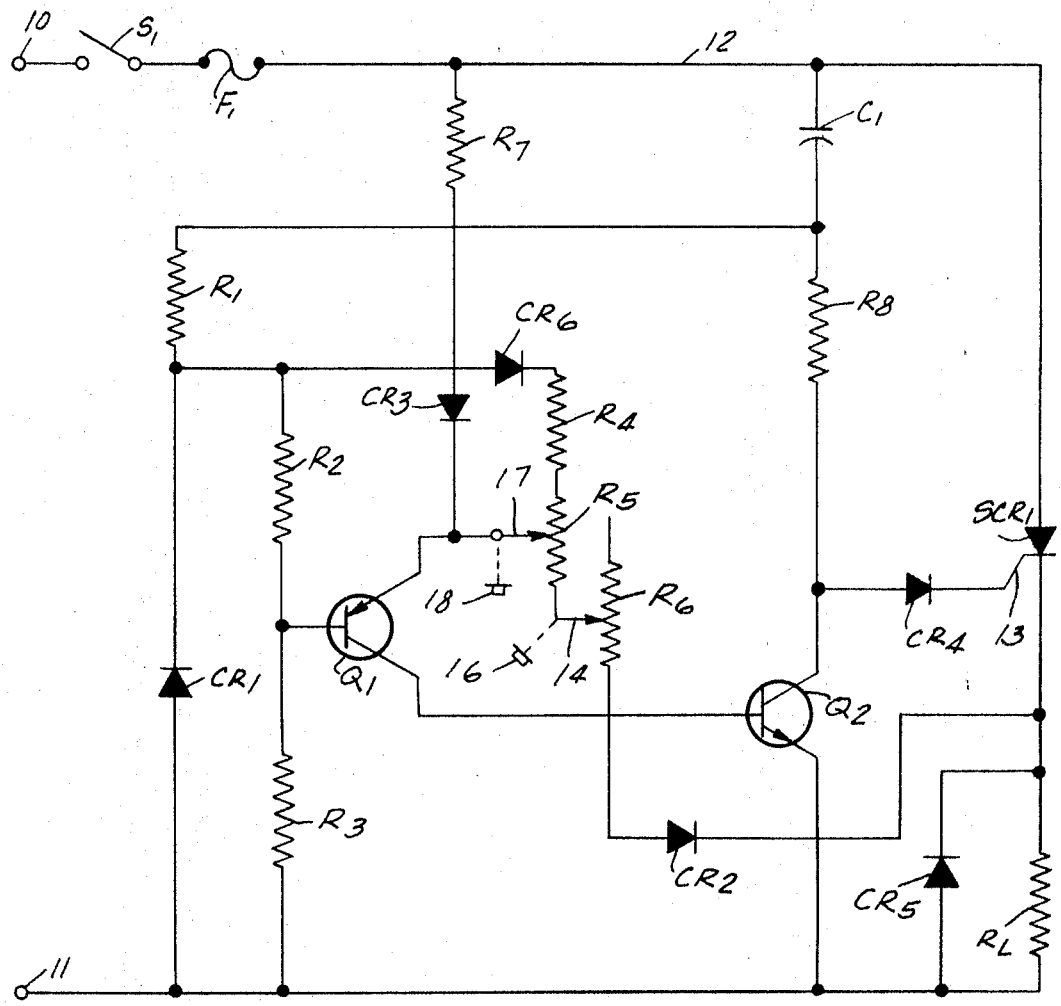
INVENTOR.
BOBBY ROSS FLEMING
BY *Hill, Sherman, Meroni, Gross & Simpson*
ATTORNEYS

3,597,590

ELECTRIC BLANKET CONTROL

BACKGROUND OF THE INVENTION

1. Field of the Invention

This invention relates in general to electronic controls for heating devices and in particular to a control for an electric blanket.

2. Description of the Prior Art

Controls for electric blankets have in some instances maintained desired control of temperature of the blanket. Particularly when the ambient temperature varies, prior controls for blankets have, in some instances, not maintained the temperature of the blanket stable. Also, certain prior controls for blankets have emitted radiofrequency interference because they switch power at points other than the zero crossing which gives rise to sharp wave fronts and resulting radio frequency emission. Such emission interferes with electronic equipment such as television and radio receivers and is very undesirable.

SUMMARY OF THE INVENTION

The present invention includes an electronic control circuit for an electric heating device in which either no power is applied or else half-wave DC is applied to the heating element. A silicon-controlled rectifier is connected in series with the heating element and is controlled by a bridge circuit including the impedance of the heater element to turn on the SCR when the heater temperature is below the desired temperature. A diode is connected in circuit with the bridge circuit so as to balance the temperature coefficients of components in the bridge circuit for providing temperature compensation. A further diode is connected in parallel with the heating element to conduct a heavy current to blow a fuse if the SCR becomes shorted.

Other and further objects, features and advantages of the present invention will become apparent to those skilled in the art from the following detailed disclosure thereof and the drawings attached hereto and made a part hereof.

BRIEF DESCRIPTION OF THE DRAWING

The Fig. is a schematic view of the electronic control for an electric blanket according to this invention.

DESCRIPTION OF THE PREFERRED EMBODIMENT

The Fig. illustrates a pair of input terminals 10 and 11 to which a suitable alternating current power supply may be connected as, for example, 110—60 cycle AC. An on-off switch $S_1$ is connected to one of the input terminals 10 and a fuse $F_1$ is connected to the on-off switch $S_1$. The anode of a switching means, such as a silicon-controlled rectifier $SCR_1$, also referred to hereinafter as the SCR, is connected to the fuse $F_1$ and the cathode of the silicon-controlled rectifier $SCR_1$ is connected to one side of a heating element $R_L$ of an electric device such as a blanket. The other side of the heating element $R_L$ is connected to the other input terminal 11. A protective diode $CR_5$ is connected in parallel with the heating element $R_L$ and has its anode connected to the input terminal 11 and its cathode connected to the cathode of the SCR. A circuit means includes a phase-shifting element $C_1$ comprising a capacitor connected from a power lead 12 through a resistor $R_8$ to the anode of a gating diode $CR_4$ that has its cathode connected to the gate electrode 13 of the silicon-controlled rectifier SCR to supply a biasing voltage thereto. A gating switch or transistor $Q_2$ has its collector connected to the input terminal 11. A resistor $R_7$ connects the power lead 12 through a diode $CR_3$ to the emitter of a gating transistor or switch $Q_1$. The collector of the gating transistor $Q_1$ is connected to the base of a further gating transistor $Q_2$. A resistor $R_1$ has one side connected to the junction point between the capacitor $C_1$ and resistor $R_8$ and the other side connected to the cathode of the diode $CR_1$. The anode of diode $CR_1$ is connected to input terminal 11. Resistors $R_2$ and $R_3$ are connected in parallel with the diode $CR_1$ and their junction point is connected to the base of transistor $Q_1$.

A diode $CR_6$ has its anode connected to the junction point between the resistors $R_1$ and $R_2$ and its cathode connected to a resistor $R_4$. The other side of resistor $R_4$ is connected to a resistor $R_5$ which has its other side connected to a wiper contact 14 that makes contact with a resistor $R_6$. One side of resistor $R_6$ is connected to the anode of diode $CR_2$ which has its cathode connected to the cathode of the $SCR_1$. A knob 16 is mechanically coupled to the wiper contact 14 to adjust it to allow the temperature of the heating element to be set. A wiper contact 17 makes sliding engagement with the resistor $R_5$ and is connected to the wiper contact 17 to allow calibration of the heating element.

All of the components illustrated in the FIG., except the heating element $R_L$, would be mounted in a suitable control unit remote from the heating element $R_L$. This assures that the components of the control system are less susceptible to sensing ambient temperature changes in $R_L$. The heating element accomplishes all of the sensing of temperature changes.

In operation, power is supplied to the terminals 10 and 11 and the switch $S_1$ is closed to turn the heating element on. The resistors $R_2$, $R_3$, $R_4$, $R_5$, $R_6$ and $R_L$ form a bridge circuit and when the resistance of the heating element $R_L$ is relatively low, occurring when the heating element is relatively cool, the bridge biases the transistors $Q_1$ and $Q_2$ off. Under this condition, a signal is applied to the gate of the SCR through the capacitor $C_1$ and the resistor $R_8$ and diode $CR_4$ so that positive half-cycles of the applied voltage are passed by the $SCR_1$ and pass through the heating element $R_L$ to heat it.

The capacitor $C_1$ advances the phase of the trigger voltage to the SCR so that the SCR fires on the zero crossing of the positive half-cycle of the power supply. This prevents radiofrequency interference which should occur if the SCR were triggered on at a voltage other than the zero crossing.

The heating element $R_L$ will continue to heat until it has reached a desired temperature as established by the setting of slide contacts 14 and 17. As the resistance $R_L$ becomes hotter, its impedance increases and the bridge circuit in which it forms a part will turn on transistor $Q_1$ which in turn turns on transistor $Q_2$ thus reducing the voltage on the gate 13 of the SCR so that it will no longer fire and power will be turned off to the heating element $R_L$.

This condition will continue until the heating element $R_L$ has cooled down sufficiently so that the bridge of which it forms a part turns off the transistors $Q_1$ and $Q_2$, thus allowing the SCR to be again gated and allow power to be applied to the resistor $R_L$.

The diode $CR_5$ prevents the resistor $R_L$ from getting too hot if the SCR shorts out. When this occurs, full-wave power is applied through the SCR to the diode $CR_5$ and the resistor $R_L$ and the diode $CR_5$ shorts out the negative half-cycles of the power which will cause the fuse $F_1$ to blow very quickly and turn power off to the heating element $R_L$.

The control applies either no power or half-wave DC power to the load. Load power is turned on or off by changes in load resistance which are sensed by transistor $Q_1$ and amplified by transistors $Q_1$ and $Q_2$ to control the $SCR_1$. The capacitor $C_1$ supplies a current whose phase angle is about 80° ahead of the line voltage. ($C_1$ is an AC constant current source.) About 15 percent of this current is available to turn on the SCR on every positive half-cycle. If the gating transistor $Q_2$ is nonconductive or turned off, the SCR will conduct during complete positive half-cycles, turning off when the line voltage starts to go negative and load current drops to zero at the end of each positive half-cycle.

The load may be kept off by merely turning the gating transistor $Q_2$ on. The bridge-sensing network of this invention controls the gating transistor $Q_2$ for this purpose. The diode $CR_1$ supplies half-wave DC to the bridge. The resistors $R_2$ and $R_3$ form one side of the bridge and the resistors $R_4$, $R_5$ and $R_L$ form the other side of the bridge. The resistor $R_5$ is a calibration potentiometer for balancing the bridge in the range desired by movement of its wiper contact 17. The resistor $R_6$ is a temperature setting potentiometer which adds resistance to the load resistance being sensed.

The diodes $CR_2$ and $CR_4$ block the load voltage from affecting the sensing circuit when the SCR is conductive. In the event that the SCR shorts out, thereby allowing full-wave current to the heating element, the protective diode $CR_5$ will bypass the negative half-cycles of the current around the heating element, causing the fuse $F_1$ to open, thus removing power from the heating element and the control. The diode $CR_2$ is, to some extent, temperature sensitive, and therefore the temperature-compensating diode $CR_6$ is provided to yield a corresponding temperature-compensating reaction in the bridge. The diode $CR_3$ and the resistor $R_7$ provide a signal in phase with the line voltage, which signal holds the gating transistor $Q_2$ "on" when the line voltage goes positive. The condition prevents the SCR from firing when the line voltage is greater than approximately 10 volts.

Average power to the load is varied by changes in the duty cycle, namely the percentage of "on" time. When the heating element $R_L$ heats up, its impedance increases and turns power off at a cutout point. After it cools to the cut-in point, power is again applied. The higher the heating element temperature is above ambient temperature, the more rapid the cooling and, consequently, the longer the duty cycle.

This action applies more average power to the load for higher temperatures, which action is desired.

To calibrate the control, wiper contact 14 is moved by knob 16 for the existing blanket ambient (for example, if the room temperature is at 75° F., $R_6$ could be set at midposition). Then wiper contact 17 is adjusted by knob 18 so that the $SCR_1$ will occasionally fire. The temperature of the blanket can then be controlled by changing wiper contact 14 with knob 16 to the desired temperature.

In particular electronic control according to this invention, the following components were used:

$C_1$—0.47 mfd.
$CR_1$—E-B Diode of EL 220
$CR_2$-$CR_3$-$CR_4$-$CR_5$-$CR_6$—Type IN4003
$Q_1$—Type MPS 6516
$Q_2$—Type MPS 6512
$SCR_1$—Type MCR2304-4
$R_1$—820 ohms
$R_2$—28 K ohm
$R_3$—7.5 K ohm
$R_4$—430 ohms
$R_5$—100 ohms Trimpot
$R_6$—10 ohms
$R_7$—10 K ohm
$R_8$—8200 ohms
$R_L$—35 ohm Blanket Load
$F_1$—GJV-4-Bussman It will be understood that modifications and variations may be effected without departing from the spirit and scope of the novel concepts of the present invention.

I claim as my invention:

1. A control circuit for an electrical heating element comprising
   a. switching means connected in series with the heating element for connection of a source of AC voltage,
   b. means for biasing said switching means to provide current conduction through the heating element including
      1. circuit means for supplying a biasing voltage including means for advancing the phase of the biasing voltage with respect to the phase of the source of AC voltage,
      2. a gating switch circuit connected between a point in said circuit means and said switching means,
      3. electrical means comprising a bridge including temperature-setting means in a leg of said bridge for detecting a temperature change of the heating element and connected to said gating switch for actuation thereof in response to the temperature of the heating element, and
      4. means connected in circuit with said electrical detecting means for compensating said detecting means for ambient temperature variations said compensating means comprising a pair of diodes located in series in a leg of said detecting bridge on either side of said temperature-setting means and said diodes being temperature-responsive in compensating mode with respect to each other such that variations in temperature do not affect the temperature setting.

2. A control circuit for an electrical heating element according to claim 1 wherein said switching means comprises a silicon-controlled rectifier.

3. A control circuit according to claim 1 wherein said phase-advancing means includes a capacitor.

4. A control circuit according to claim 1 wherein said gating switch circuit includes a first transistor.

5. A control circuit according to claim 4 wherein said gating switch circuit includes a second transistor coacting with the first transistor.

6. A control circuit according to claim 1 including current-limiting means connected in series with the heating element and the source of AC voltage, and a protective diode connected in parallel with the heating element for protecting said load.